Feb. 10, 1942.  E. A. GLYNN  2,272,637
METHOD OF RECAPPING TIRES
Filed Jan. 28, 1939   2 Sheets-Sheet 1

INVENTOR
E. A. Glynn
BY
ATTORNEY

Feb. 10, 1942.  E. A. GLYNN  2,272,637

METHOD OF RECAPPING TIRES

Filed Jan. 28, 1939  2 Sheets-Sheet 2

INVENTOR
E. A. Glynn
BY
ATTORNEY

UNITED STATES PATENT OFFICE 2,272,637

METHOD OF RECAPPING TIRES

Edwin A. Glynn, Lodi, Calif., assignor to Super Mold Corporation of California

Application January 28, 1939, Serial No. 253,358

1 Claim. (Cl. 18—59)

This invention relates to full-circle tire vulcanizing molds of the recapping type as distinguished from the full retreading type, and is a divisional part of my copending application, Serial No. 117,304, filed December 23, 1936, particularly with respect to the form of the matrix and its relation to the tire and to the tire engaging pressure plates of the mold.

It is now well recognized in the industry that tires of the same nominal diameter—both major and cross-sectional—are apt to vary somewhat in actual size from their nominal dimensions. With equipment previously used, and which does not take these variations in size into account, it has been found hard, if not impossible, to obtain good results in all cases, unless a different matrix was used for each variation in tire size.

It is therefore the major object of this invention to provide a matrix so constructed that no matrix marks, of a nature either detrimental to the appearance of the tire or to its subsequent wearing qualities, are left on the tire by a recapping operation, irrespective of any variation in tire size, and with the use of a single matrix for all such size variations.

Another object is to construct the matrix so that in all cases, a positive and firm seal will be formed all about the exposed side edges of the recap rubber, at the junction thereof with the old rubber of the tire.

Also, the matrix is constructed so that extreme accuracy in the width of the camelback, which forms the new or recap tread, or in the positioning of the same on the tire is unnecessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
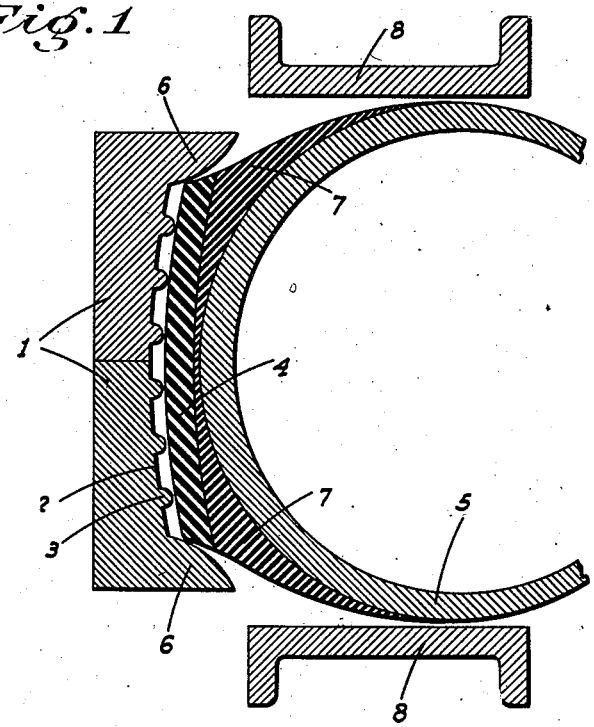
Figure 1 is a fragmentary and somewhat diagrammatic cross-section of my improved matrix, shown in connection with the cooperating pressure plates of the mold, and with a tire of smaller than nominal diameter as initially placed in the mold.

Referring now more particularly to the characters of reference on the drawings, the matrix, as in common in full circle molds, is a two-part unit comprising a pair of separate endless circular ring-like sections 1, mounted for relative axial movement in any suitable manner, as shown for instance in said copending application.

The tire-tread or camelback engaging face 2 of the matirx unit is preferably formed with a somewhat flat or shallow concave curvature, and is provided with inwardly projecting tread design elements such as ribs 3. The width of the face 2 is substantially the same as that of a predetermined standard width of camelback 4 for the tire 5 of the size for which the matrix is designed, and the diameter of the face 2 is the same as the nominal major diameter of such tire.

At the outer opposite edges of the face 2, the sections 1 are formed with flanges 6 which project radially inward. The adjacent or tire engaging faces of the flanges flare away from each other, such flare preferably being of convexly curved form, with the center of curvature positioned so that the flare or divergence adjacent the face 2 is comparatively slight, or less than that of the camelback and adjacent side rubber 7 of the tire. The flanges are relatively short, but are of sufficient length to extend radially inward of the tire some distance beyond the camelback 4 and the line of junction of the same with the old side rubber 7 of the tire. The transverse spacing between the flanges at their inner end is less than the cross-sectional diameter of the tire.

Associated with the matrix unit and disposed radially inward of the flanges so as to clear the same are the pressure plates 8. These, as usual, are of ring-like form and are movable toward or from each other axially of the tire, having a width radially of the tire sufficient to engage a considerable portion of the area of the sides of the tire.

This form of the flanges will cause the new rubber 4 at its side faces, when the tire is pressed into full engagement with the matrix, to be compressed along with the adjacent portion of the old side rubber 7, especially at their junction. This will cause the rubbers to merge into each other, smoothly, and also giving a very positive seal due to this extra rubber compressing action. In addition, the flanges have another valuable function as will now be seen, and which is particularly important when dealing, as is inevitable, with tires of theoretically the same, but actually different, sizes.

Figure 2:
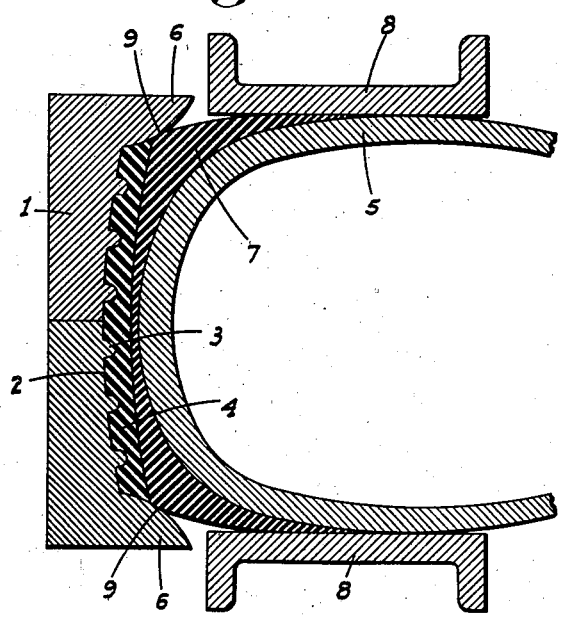
Figure 2 is a similar view showing the pressure plates advanced to force the recap or camelback rubber into vulcanizing position in the matrix.

Referring to Fig. 1, the tire depicted therein is of undersize or relatively small major diameter, so that it initially fits the matrix with clearance to spare. It is therefore necessary to advance the pressure plates 8 so as to press the sides of the tire together and thus force the tread portion radially out into proper engagement with the matrix face 2, as shown in Fig. 2. The camelback and the immediately adjacent portions of the side rubber 7 are, however, not affected in width by this action of the pressure plates, and the tread rubber at the sides is thus engaged and compressed by the curving flanges as previously explained. The transverse movement of the side walls of the tire in this case, however, due to the small size of the tire, causes the side rubber to leave the flanges close to, but in no case radially out from, the points of junction of the recap and side rubber, or at points indicated at 9. Due to the fact that the flanges flare or diverge from these points with an easy slope or curvature, they do not leave any mark on the tire at these leaving points. This avoids the formation of any abrupt corners or creases in the rubber, which tend to weaken the rubber and cause a "hinge" action when the tire flexes in service and frequently results in the new rubber pulling away from the tire. Also, such creases or corners mar the appearance of the tire. The holding of the side rubber 7 against the flanges to the leaving points 9, against the tendency of the pressure plates to draw said rubber away from the flanges, is aided by the air pressure in the tire, which is increased after the pressure plates have been advanced and which tends to force outwardly, those portions of the tire exposed between and which are not engaged or supported by either the matrix or pressure plates.

Figure 3:
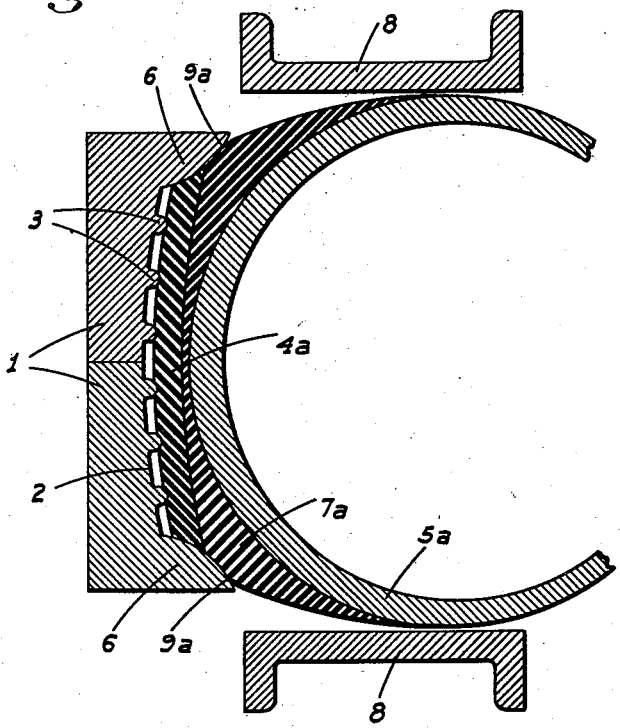
Figure 3 is a view similar to Fig. 1, but showing a tire of greater than nominal diameter as initially placed in the mold.
Figure 4:
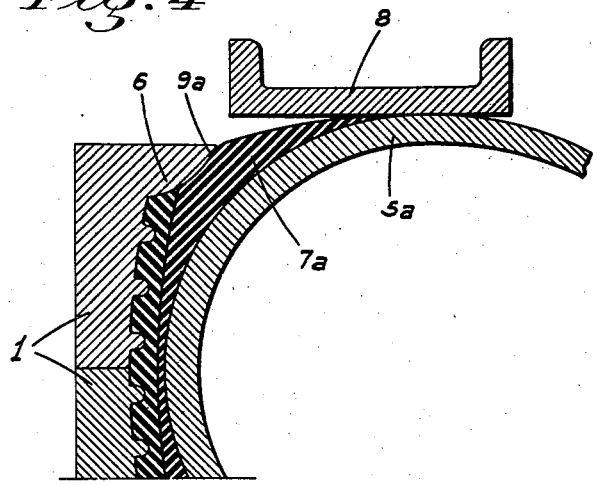
Figure 4 is a similar view, with the tire of Fig. 3 engaged by the pressure plates.

The same results, as to the formation of a perfect seal between the recap and old rubber, and the smoothness of appearance of the finished tire, are obtained with equal efficiency when the tire is oversize or of large diameter relative to the matrix, as shown in Fig. 3. In this case, since the recap rubber 4a of the tire 5a engages the tread design elements of the matrix when being initially inserted, the tire is distorted slightly so that it becomes wider than normal. This distortion causes the side rubber 7a of the tire to bulge out and engage the flanges for practically their full extent, or even sometimes so that the ends of the flanges cut into the rubber slightly.

However, when the pressure plates are advanced, as they must always be to a certain extent to force the tread rubber well into the matrix, the side walls of the tire are moved toward each other sufficiently so that the side rubber leaves the flanges at points 9a near but clear of their ends. Here again, therefore, the matrix flanges leave the tire smoothly without any disfiguring or detrimental marks being left, and of course the compressive seal-forming action of the flanges on the rubber along the lines of junction of the old and new rubber is obtained.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claim.

Having thus described my invention, what I claim as new and useful and desire to secure by Letters Patent is:

That method of recapping a tire comprising the steps of placing a strip of unvulcanized rubber on the worn tread surface of the tire between the edges of the shoulders of the original tread rubber remaining on said tire, placing a matrix having relatively short flanges over the tread portion of the tire with the flanges overhanging the outer side surfaces of said shoulders only, and extending radially inwardly of the tread engaging surface of the matrix, bulging the carcass of the tire laterally at points between the side walls and tread thereof to bring the side surfaces of the shoulders into tight sealing contact with the overhanging flanges of the matrix, applying pressure within the tire while restraining the side walls from bulging outwardly along areas spaced from the shoulders, and applying heat to the matrix.

EDWIN A. GLYNN.